US009019234B2

(12) United States Patent
Lewis et al.

(10) Patent No.: US 9,019,234 B2
(45) Date of Patent: Apr. 28, 2015

(54) NON-SCREEN CAPACITIVE TOUCH SURFACE FOR BOOKMARKING AN ELECTRONIC PERSONAL DISPLAY

(71) Applicant: Kobo Incorporated, Toronto (CA)

(72) Inventors: Damian Lewis, Toronto (CA); Ryan Sood, Toronto (CA)

(73) Assignee: Kobo Incorporated, Toronto, Ontario (CA)

( * ) Notice: Subject to any disclaimer, the term of this patent is extended or adjusted under 35 U.S.C. 154(b) by 68 days.

(21) Appl. No.: 14/015,739

(22) Filed: Aug. 30, 2013

(65) Prior Publication Data

US 2015/0062055 A1 Mar. 5, 2015

(51) Int. Cl.
*G06F 3/045* (2006.01)
*G06F 3/044* (2006.01)

(52) U.S. Cl.
CPC ...................................... *G06F 3/044* (2013.01)

(58) Field of Classification Search
USPC ...................... 345/173–178; 178/18.01–18.09
See application file for complete search history.

(56) References Cited

U.S. PATENT DOCUMENTS

| 2011/0209089 A1* | 8/2011 | Hinckley et al. | 715/810 |
| 2011/0209102 A1* | 8/2011 | Hinckley et al. | 715/863 |
| 2013/0169545 A1* | 7/2013 | Eaton et al. | 345/173 |
| 2013/0300668 A1* | 11/2013 | Churikov et al. | 345/168 |

* cited by examiner

*Primary Examiner* — Premal Patel

(57) ABSTRACT

A method and system for utilizing a non-screen capacitive touch surface for bookmarking an electronic personal display is disclosed. One example provides a capacitive touch sensing surface on at least two non-planar portions of a housing of the electronic personal display. The capacitive touch sensing surface is monitored for a pinch and slide type contact from at least two non-planar points. In so doing, when the pinch and slide type contact is detected a bookmarking operation on the electronic personal display is performed.

21 Claims, 7 Drawing Sheets

Section A-A

NON-SCREEN CAPACITIVE TOUCH SURFACE FOR BOOKMARKING AN ELECTRONIC PERSONAL DISPLAY

BACKGROUND

An electronic reader, also known as an eReader, is a mobile electronic device that is used for reading electronic books (eBooks), electronic magazines, and other digital content. For example, the content of an eBook is displayed as words and/or images on the display of an eReader such that a user may read the content much in the same way as reading the content of a page in a paper-based book. An eReader provides a convenient format to store, transport, and view a large collection of digital content that would otherwise potentially take up a large volume of space in traditional paper format.

In some instances, eReaders are purpose built devices designed especially to perform especially well at displaying readable content. For example, a purpose built eReader may include a display that reduces glare, performs well in high light conditions, and/or mimics the look of text on actual paper. While such purpose built eReaders may excel at displaying content for a user to read, they may also perform other functions, such as displaying images, emitting audio, recording audio, and web surfing, among others.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Figure 1A:
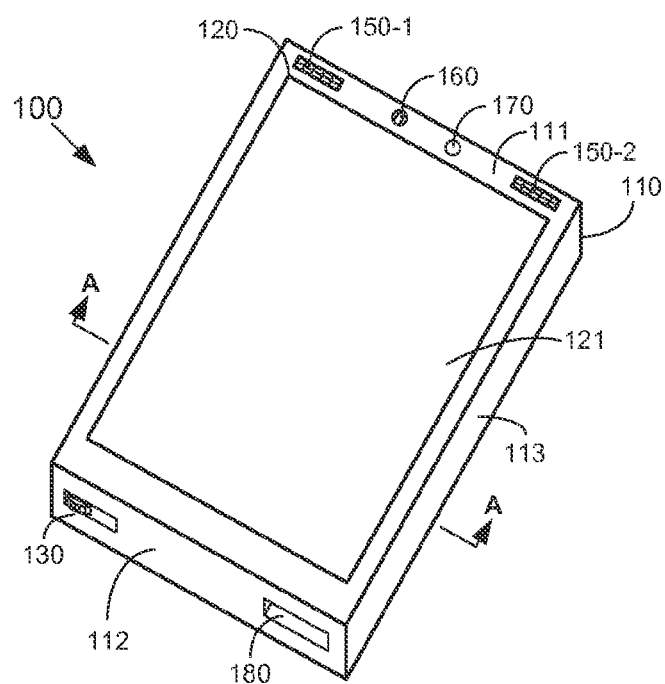
FIG. 1A shows a front perspective view of an electronic reader (eReader), in accordance with various embodiments.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "determining", ""detecting", "generating", "outputting", "receiving", "monitoring", "powering-up", "powering down" or the like, often refer to the actions and processes of an electronic computing device/system, such as an electronic reader ("eReader"), electronic personal display, and/or a mobile (i.e., handheld) multimedia device, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview of Discussion

In the following discussion a button free electronic personal display bookmarking technology is disclosed. In one embodiment, the housing of the electronic personal display includes capacitive touch sensors. In addition, instead of having a bookmark button, the electronic personal display monitors the capacitive touch sensors for a pinch and slide type contact. When the device is appropriately "pinched" and the pinch is then slid along the capacitive touch sensors, a bookmarking action is performed. In general, a "pinch" occurs when the device is concurrently touched from at least two overlapping non-planar points. One example of a concurrent touching that occurs from at least two overlapping non-planner points would be the touching of a front side surface at a point approximately 1 inch down from the top of the device and, at the same time, a touching of a back side surface at a point approximately 1 inch down from the top of the device. The touches are concurrent because they occur at the same time, they are overlapping because they both occur at a point approximately 1 inch down from the top of the device, and they are non-planner because they occur on two different planes (e.g., the front surface plane and the back surface plane).

In one embodiment, the "slide" occurs when the "pinch" is drug along a portion of the capacitive touch sensors in a pre-determined direction for a pre-defined distance.

In one embodiment, because the bookmarking trigger is based on capacitive touch sensor interaction and possibly a predetermined pattern of motion contemporaneous with maintaining the touch contact with the touch-sensitive surface, an actual physical button, an actual physical button is not required on the electronic personal display. By removing any buttons on the device, a greater robustness with regard to dust, fluid contaminants and the like can be achieved. In one embodiment, the electronic personal display is an eReader.

Discussion will begin with description of an example eReader and various components that may be included in some embodiments of an eReader. Various display and touch sensing technologies that may be utilized with some embodiments of an eReader will then be described. An example computing system, which may be included as a component of an eReader, will then be described. Operation of an example eReader and several of its components will then be described in more detail in conjunction with a description of an example method of utilizing a non-screen capacitive touch surface for bookmarking an electronic personal display.

Example Electronic Reader (eReader)

FIG. 1A shows a front perspective view of an eReader 100, in accordance with various embodiments. In general, eReader 100 is one example of an electronic personal display. Although an eReader is discussed specifically herein for purposes of example, concepts discussed are equally applicable to other types of electronic personal displays such as, but not limited to, mobile digital devices/tablet computers and/or multimedia smart phones. As depicted, eReader 100 includes a display 120, a housing 110, and some form of on/off switch 130. In some embodiments, eReader 100 may further include one or more of: speakers 150 (150-1 and 150-2 depicted), microphone 160, digital camera 170, 3D motion sensor 175 and removable storage media slot 180. Section lines depict a region and direction of a section A-A which is shown in greater detail in FIG. 2A.

Housing 110 forms an external shell in which display 120 is situated and which houses electronics and other components that are included in an embodiment of eReader 100. In FIG. 1A, a front surface 111, a bottom surface 112, and a right side surface 113 are visible. Although depicted as a single piece, housing 110 may be formed of a plurality of joined or inter-coupled portions. Housing 110 may be formed of a variety of materials such as plastics, metals, or combinations of different materials.

Display 120 has an outer surface 121 (sometimes referred to as a bezel) through which a user may view digital contents such as alphanumeric characters and/or graphic images that are displayed on display 120. Display 120 may be any one of a number of types of displays including, but not limited to: a liquid crystal display, a light emitting diode display, a plasma display, a bistable display or other display suitable for creating graphic images and alphanumeric characters recognizable to a user.

On/off switch 130 is utilized to power on/power off eReader 100. On/off switch 130 may be a slide switch (as depicted), button switch, toggle switch, touch sensitive switch, or other switch suitable for receiving user input to power on/power off eReader 100.

Speaker(s) 150, when included, operates to emit audible sounds from eReader 100. A speaker 150 may reproduce sounds from a digital file stored on or being processed by eReader 100 and/or may emit other sounds as directed by a processor of eReader 100.

Microphone 160, when included, operates to receive audible sounds from the environment proximate eReader 100. Some examples of sounds that may be received by microphone 160 include voice, music, and/or ambient noise in the area proximate eReader 100. Sounds received by microphone 160 may be recorded to a digital memory of eReader 100 and/or processed by a processor of eReader 100.

Digital camera 170, when included, operates to receive images from the environment proximate eReader 100. Some examples of images that may be received by digital camera 170 include an image of the face of a user operating eReader 100 and/or an image of the environment in the field of view of digital camera 170. Images received by digital camera 170 may be still or moving and may be recorded to a digital memory of eReader 100 and/or processed by a processor of eReader 100.

Removable storage media slot 180, when included, operates to removably couple with and interface to an inserted item of removable storage media, such as a non-volatile memory card (e.g., MultiMediaCard ("MMC"), a secure digital ("SD") card, or the like). Digital content for play by eReader 100 and/or instructions for eReader 100 may be stored on removable storage media inserted into removable storage media slot 180. Additionally or alternatively, eReader 100 may record or store information on removable storage media inserted into removable storage media slot 180.

Figure 1B:
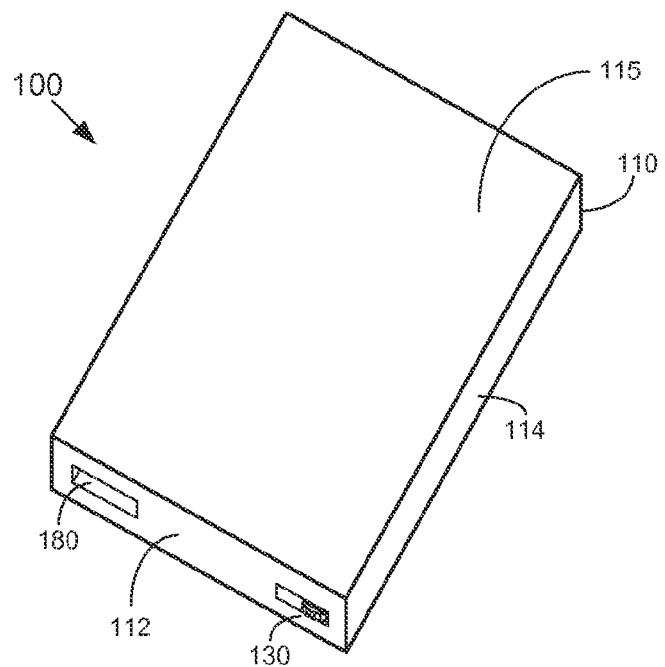
FIG. 1B shows a rear perspective view of the eReader of FIG. 1A, in accordance with various embodiments.

FIG. 1B shows a rear perspective view of eReader 100 of FIG. 1A, in accordance with various embodiments. In FIG. 1B, a rear surface 115 of the non-display side of the housing 110 of eReader 100 is visible. Also visible in FIG. 1B is a left side surface 114 of housing 110. It is appreciated that housing 110 also includes a top surface which is not visible in either FIG. 1A or FIG. 1B.

Figure 2A:
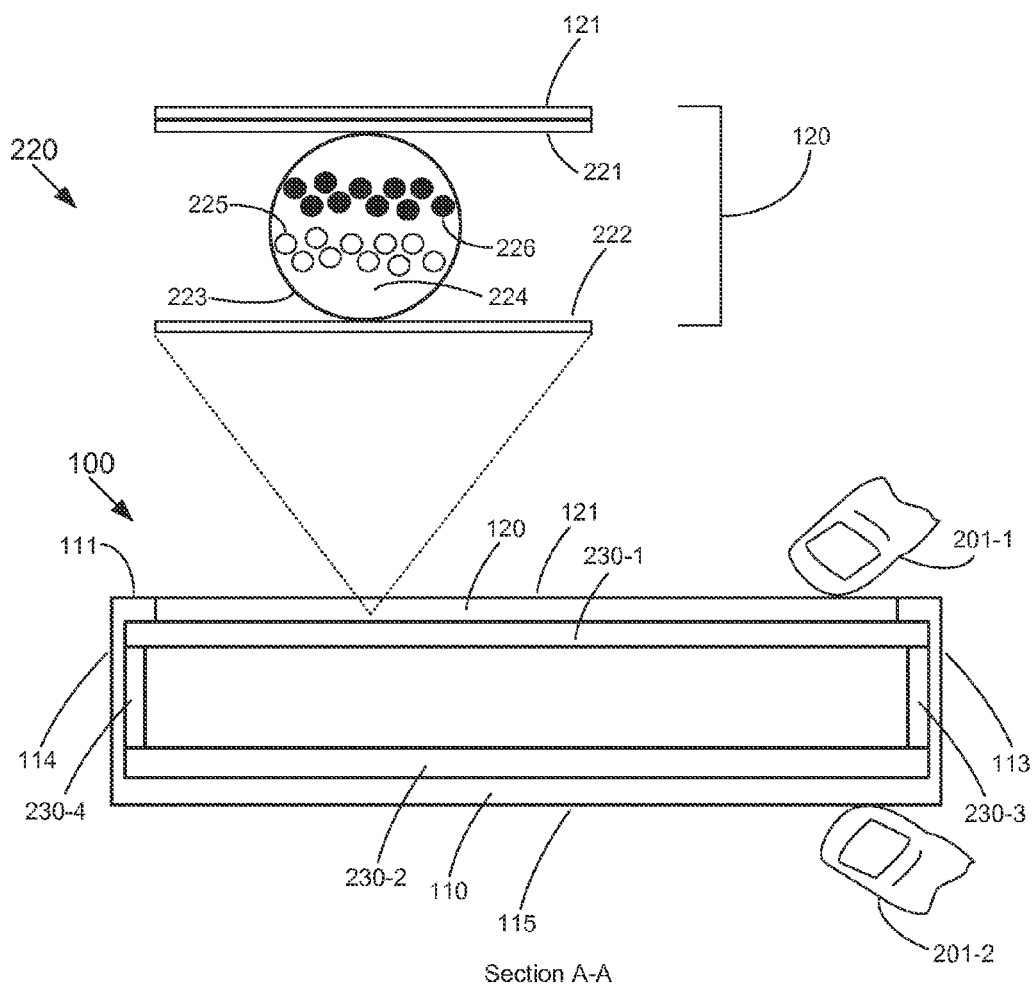
FIG. 2A shows a cross-section of the eReader of FIG. 1A along with a detail view of a portion of the display of the eReader, in accordance with various embodiments.

FIG. 2A shows a cross-section A-A of eReader 100 along with a detail view 220 of a portion of display 120, in accordance with various embodiments. In addition to display 120 and housing 110, a plurality of touch sensors 230 are visible and illustrated in block diagram form. It should be appreciated that a variety of touch sensing technologies may be utilized to form touch sensors 230 that are included in embodiments of eReader 100; these include, but are not limited to: resistive touch sensors; capacitive touch sensors (using self and/or mutual capacitance); inductive touch sensors; and infrared touch sensors. In general, resistive touch sensing responds to pressure applied to a touched surface and is implemented using a patterned sensor design on, within, or beneath display 120, rear surface 115, and/or other surface of housing 110. In general, inductive touch sensing requires the use of a stylus and are implemented with a patterned electrode array disposed on, within, or beneath display 120, rear surface 115, and/or other surface of housing 110 In general, capacitive touch sensing utilizes a patterned electrode array disposed on, within, or beneath display 120, rear surface 115, and/or other surface of housing 110; and the patterned electrodes sense changes in capacitance caused by the proximity or contact by an input object. In general, infrared touch sensing operates to sense an input object breaking one or more infrared beams that are projected over a surface such as outer surface 121, rear surface 115, and/or other surface of housing 110.

Once an input object interaction is detected by a touch sensor 230, it is interpreted either by a special purpose processor (e.g., an application specific integrated circuit (ASIC)) that is coupled with the touch sensor 230 and the interpretation is passed to a processor of eReader 100, or a processor of eReader is used to directly operate and/or interpret input object interactions received from a touch sensor 230. It should be appreciated that in some embodiments, patterned sensors and/or electrodes may be formed of optically transparent material such as very thin wires or a material such as indium tin oxide (ITO).

In various embodiments one or more touch sensors 230 (230-1 front; 230-2 rear; 230-3 right side; and/or 230-4 left side) may be included in eReader 100 in order to receive user input from input object such 201 such as styli or human digits. For example, in response to proximity or touch contact with outer surface 121 or coversheet (not illustrated) disposed above outer surface 121, user input from one or more fingers such as finger 201-1 may be detected by touch sensor 230-1 and interpreted. Such user input may be used to interact with graphical content displayed on display 120 and/or to provide other input through various gestures (e.g., tapping, swiping, pinching digits together on outer surface 121, spreading digits apart on outer surface 121, or other gestures). In addition, the touch sensitivity is also capable of directional discrimination as well as extent of motion. For example, the gesture may be interpreted based on directionality and length or time that contact is maintained during the gesture action.

In a similar manner, in some embodiments, a touch sensor 230-2 may be disposed proximate rear surface 115 of housing 110 in order to receive user input from one or more input objects 201, such as human digit 201-2. In this manner, user input may be received across all or a portion of the rear surface 115 in response to proximity or touch contact with rear surface 115 by one or more user input objects 201. In some embodiments, where both front (230-1) and rear (230-2) touch sensors are included, a user input may be received and interpreted from a combination of input object interactions with both the front and rear touch sensors.

In a similar manner, in some embodiments, a left side touch sensor 230-3 and/or a right side touch sensor 230-4, when included, may be disposed proximate the respective left and/or right side surfaces (113, 114) of housing 110 in order to receive user input from one or more input objects 201. In this manner, user input may be received across all or a portion of the left side surface 113 and/or all or a portion of the right side surface 114 of housing 110 in response to proximity or touch contact with the respective surfaces by or more user input objects 201. In some embodiments, instead of utilizing a separate touch sensor, a left side touch sensor 230-3 and/or a right side touch sensor 230-4 may be a continuation of a front touch sensor 230-1 or a rear touch sensor 230-2 which is extended so as to facilitate receipt proximity/touch user input from one or more sides of housing 110.

Although not depicted, in some embodiments, one or more touch sensors 230 may be similarly included and situated in order to facilitate receipt of user input from proximity or touch contact by one or more user input objects 201 with one or more portions of the bottom 112 and/or top surfaces of housing 110.

Referring still to FIG. 2A, a detail view 220 is show of display 120, according to some embodiments. Detail 220 depicts a portion of a bistable electronic ink that is used, in some embodiments, when display 120 is a bistable display. In some embodiments, a bistable display is utilized in eReader 100 as it presents a paper and ink like image and/or because it is a reflective display rather than an emissive display and thus can present a persistent image on display 120 even when power is not supplied to display 120. In one embodiment, a bistable display comprises electronic ink the form of millions of tiny optically clear capsules 223 that are filled with an optically clear fluid 224 in which positively charged white pigment particles 225 and negatively charged black pigment particles 226 are suspended. The capsules 223 are disposed between bottom electrode 222 and a transparent top electrode 221. A transparent/optically clear protective surface is often disposed over the top of top electrode 221 and, when included, this additional transparent surface forms outer surface 121 of display 120 and forms a touch surface for receiving touch inputs. It should be appreciated that one or more intervening transparent/optically clear layers may be disposed between top electrode 221 and top electrode 221. In some embodiments, one or more of these intervening layers may include a patterned sensor and/or electrodes for touch sensor 230-1. When a positive or negative electric field is applied proximate to each of bottom electrode 222 and top electrode 221 in regions proximate capsule 223, pigment particles of opposite polarity to a field are attracted to the field, while pigment particles of similar polarity to the applied field are repelled from the field. Thus, when a positive charge is applied to top electrode 221 and a negative charge is applied to bottom electrode 221, black pigment particles 226 rise to the top of capsule 223 and white pigment particles 225 go to the bottom of capsule 223. This makes outer surface 121 appear black at the point above capsule 223 on outer surface 121. Conversely, when a negative charge is applied to top electrode 221 and a positive charge is applied to bottom electrode 221, white pigment particles 225 rise to the top of capsule 223 and black pigment particles 226 go to the bottom of capsule 223. This makes outer surface 121 appear white at the point above capsule 223 on outer surface 121. It should be appreciated that variations of this technique can be employed with more than two colors of pigment particles.

Figure 2B:
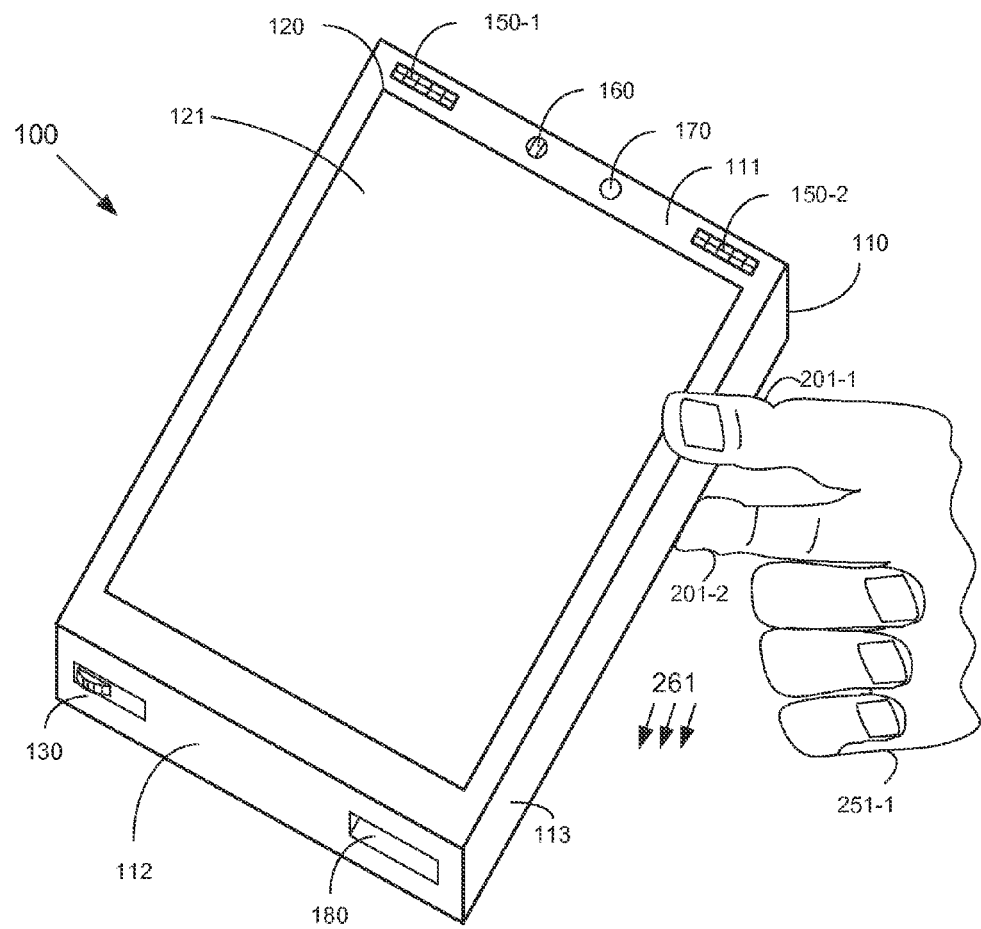
FIG. 2B shows a front perspective view of an eReader with a pinch and slide type of contact, in accordance with various embodiments.

FIG. 2B shows a front perspective view of an eReader with a pinch and slide type of contact, in accordance with various embodiments. In general, FIG. 2B includes an eReader 100 such as described in FIG. 1A. In addition, FIG. 2B includes a pinch type contact similar to that shown in FIG. 2A as represented by digits 201-1 and 201-2. However, in FIG. 2B, in addition to the digits 201-1 and 201-2 which are used to represent the pinch, hand 251-1 is also shown for purposes of clarity. Along with hand 251-1 a direction of the sliding motion 261 is also shown. Although the hand 251-1 is shown as a right hand and the pinch is shown between the thumb and forefinger, either hand may be utilized to perform the maneuver. In addition, any combination of the fingers and/or thumb may be utilized to perform the pinch. Moreover, although the pinch and slide of FIG. 2B is shown occurring on the right front and rear sides of eReader 100, the pinch and slide may be predefined or user adjustable to any of the sides of eReader 100 including, front right, left, rear, top and bottom.

In one embodiment, the pinch may occur on a first side of eReader 100 and then the slide may be defined as occurring around a corner of eReader 100. For example, the user may pinch the top right front surface 111 and the top right rear surface 115 of eReader 100 and then slide the pinch along the top, around the corner and along either the right or left side of front surface 111 and rear surface 115 of eReader 100.

In yet another embodiment, the pinch may be between to perpendicular surfaces. For example, digit 201-1 may contact right side surface 113 while digit 201-2 may contact rear surface 115. In so doing, the bookmarking gesture would consist of a perpendicular pinch followed by a slide along the two perpendicular surfaces.

Figure 3:
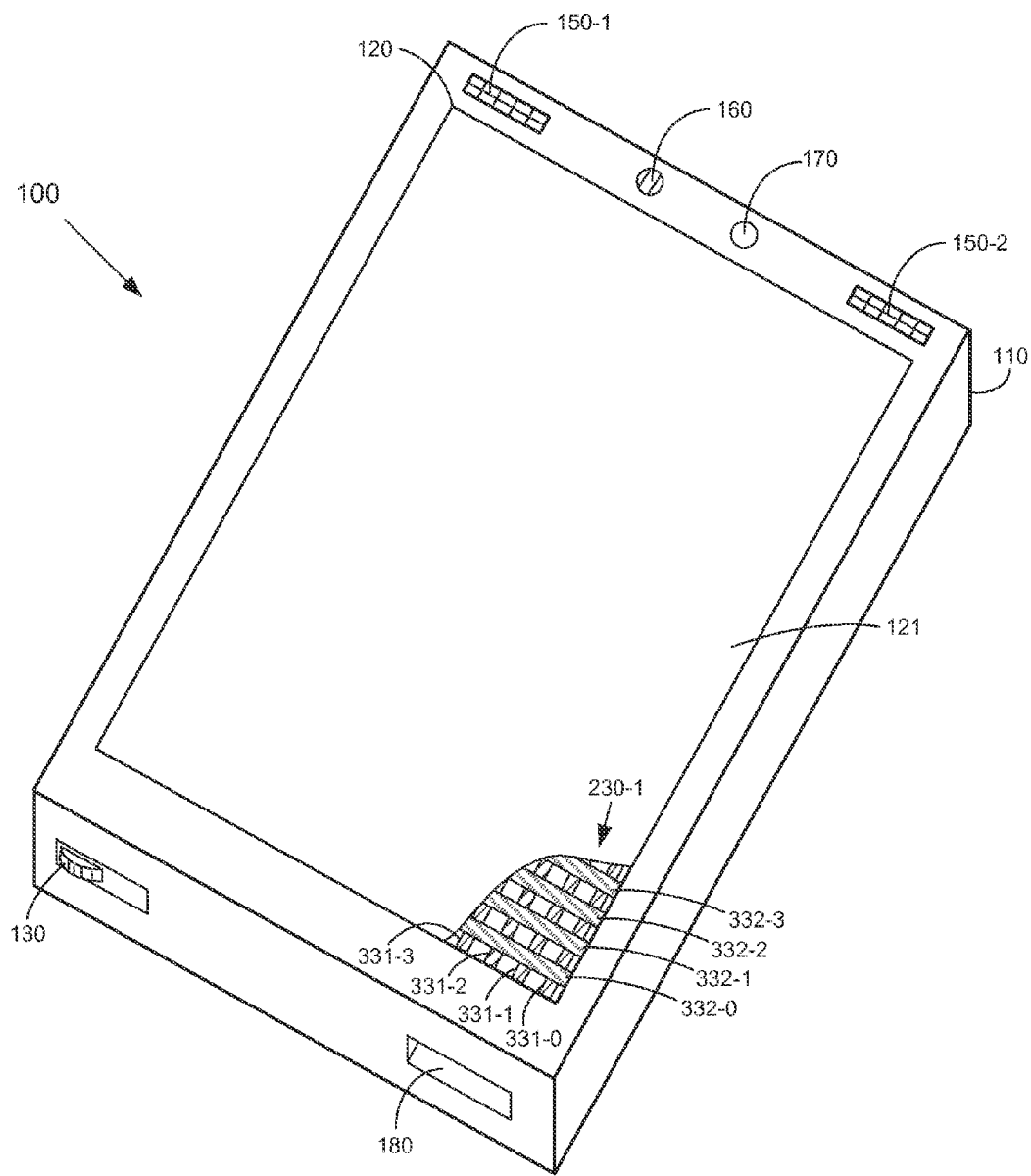
FIG. 3 shows a cutaway view of an eReader illustrating one example of a touch sensor, in accordance with an embodiment.

FIG. 3 shows a cutaway view of an eReader illustrating one example of a touch sensor 230, in accordance with an embodiment. In FIG. 3, a portion of display 120 has been removed such that a portion of underlying top sensor 230-1 is visible. As depicted, in one embodiment, top touch sensor 230-1 is illustrated as an x-y grid of sensor electrodes which may be used to perform various techniques of capacitive sensing. For example, sensor electrodes 331 (331-0, 331-1, 331-2, and 331-3 visible) are arrayed along a first axis, while sensor electrodes 332 (332-0, 332-1, 332-2, and 332-3 visible) are arrayed along a second axis that is approximately perpendicular to the first axis. It should be appreciated that a dielectric layer (not illustrated) is disposed between all or portions of sensor electrodes 331 and 332 to prevent shorting. It should also be appreciated that the pattern of sensor electrodes (331, 332) illustrated in FIG. 3 has been provided an example only, that a variety of other patterns may be similarly utilized, and some of these patterns may only utilize sensor electrodes disposed in a single layer. Additionally, while the example of FIG. 3 illustrates top sensor 230-1 as being disposed beneath display 120, in other embodiments, portions of touch sensor 230-1 may be transparent and disposed either above display 120 or integrated with display 120.

In one embodiment, by performing absolute/self-capacitive sensing with sensor electrodes 331 on the first axis a first profile of any input object contacting outer surface 121 can be formed, and then a second profile of any input object contacting outer surface 121 can be formed on an orthogonal axis by performing absolute/self-capacitive sensing on sensor electrodes 332. These capacitive profiles can be processed to determine an occurrence and/or location of a user input with made by means of an input object 201 contacting or proximate outer surface 121.

In another embodiment, by performing transcapacitive/mutual capacitive sensing between sensor electrodes 331 on the first axis and sensor electrodes 332 on the second axis a capacitive image can be formed of any input object contacting outer surface 121. This capacitive image can be processed to determine occurrence and/or location of user input made by means of an input object contacting or proximate outer surface 121.

It should be appreciated that mutual capacitive sensing is regarded as a better technique for detecting multiple simultaneous input objects in contact with a surface such as outer surface 121, while absolute capacitive sensing is regarded as a better technique for proximity sensing of objects which are near but not necessarily in contact with a surface such as outer surface 121.

In some embodiments, capacitive sensing and/or another touch sensing technique may be used to sense touch input across all or a portion of the rear surface 115 of eReader 100, and/or any other surface(s) of housing 110.

Figure 4:
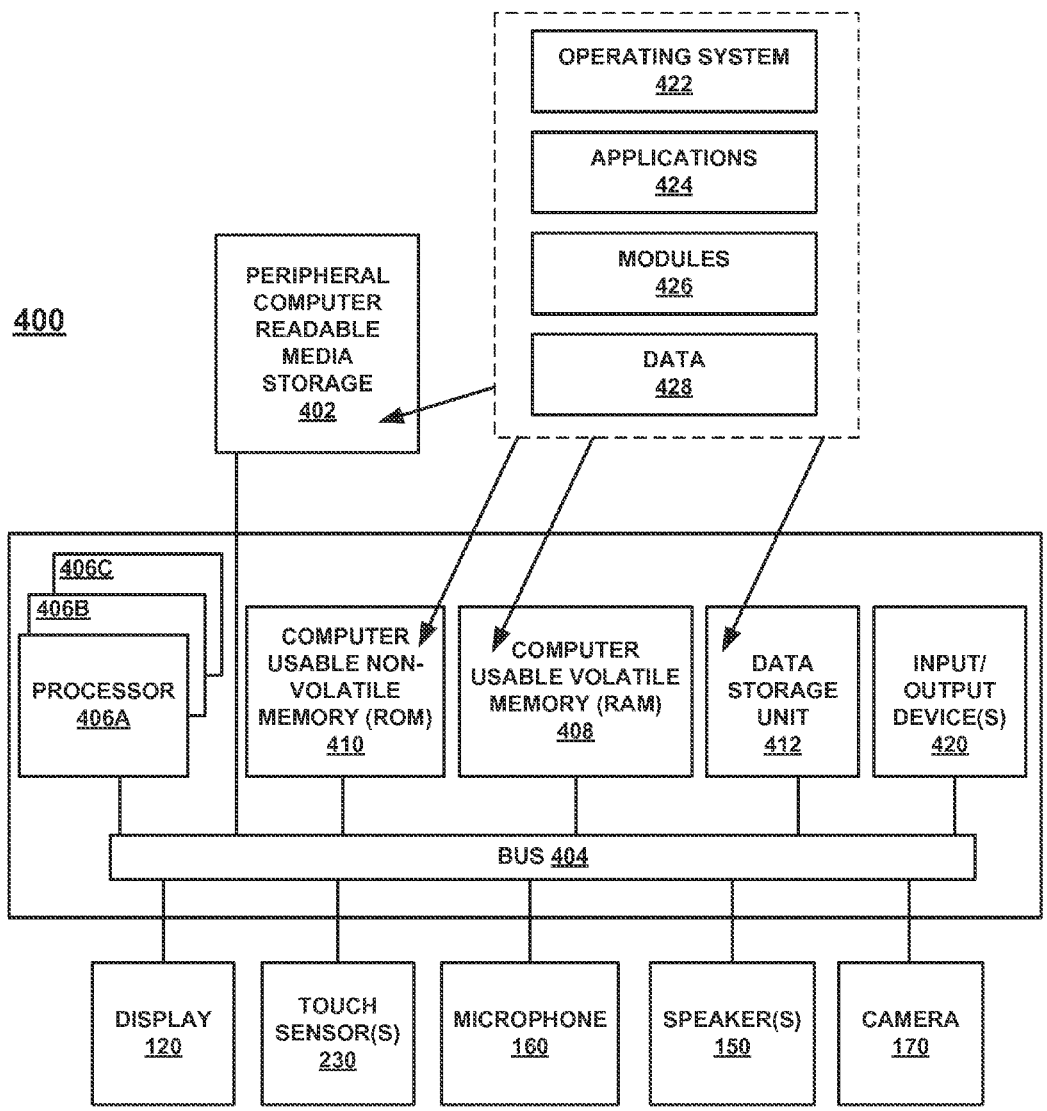
FIG. 4 shows an example computing system which may be included as a component of an eReader, according to various embodiments.

FIG. 4 shows an example computing system 400 which may be included as a component of an eReader, according to various embodiments and with which or upon which various embodiments described herein may operate.

Example Computer System Environment

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments of an eReader, such as eReader 100, which are discussed herein. It is appreciated that computer system 400 of FIG. 4 is only an example and that embodiments as described herein can operate on or within a number of different computer systems.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Processors 406A, 406B, and 406C may be any of various types of microprocessors. For example, in some multi-processor embodiments, one of the multiple processors may be a touch sensing processor and/or one of the processors may be a display processor. Conversely, system 400 is also well suited to having a single processor such as, for example, processor 406A. System 400 also includes data storage features such as a computer usable volatile memory 408, e.g., random access memory (RAM), coupled to bus 404 for storing information and instructions for processors 406A, 406B, and 406C. System 400 also includes computer usable non-volatile memory 410, e.g., read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions.

Computer system 400 of FIG. 4 is well adapted to having peripheral computer-readable storage media 402 such as, for example, a floppy disk, a compact disc, digital versatile disc, universal serial bus "flash" drive, removable memory card, and the like coupled thereto. In some embodiments, computer-readable storage media 402 may be coupled with computer system 400 (e.g., to bus 404) by insertion into removable a storage media slot, such as removable storage media slot 180 depicted in FIGS. 1A and 1B.

System 400 also includes or couples with display 120 for visibly displaying information such as alphanumeric text and graphic images. In some embodiments, system 400 also includes or couples with one or more optional touch sensors 230 for communicating information, cursor control, gesture input, command selection, and/or other user input to processor 406A or one or more of the processors in a multi-processor embodiment. In some embodiments, system 400 also includes or couples with one or more optional speakers 150 for emitting audio output. In some embodiments, system 400 also includes or couples with an optional microphone 160 for receiving/capturing audio inputs. In some embodiments, system 400 also includes or couples with an optional digital camera 170 for receiving/capturing digital images as an input.

Optional touch sensor(s) 230 allows a user of computer system 400 (e.g., a user of an eReader of which computer system 400 is a part) to dynamically signal the movement of a visible symbol (cursor) on display 120 and indicate user selections of selectable items displayed on display 120. In some embodiment other implementations of a cursor control device and/or user input device may also be included to provide input to computer system 400, a variety of these include: trackballs, keypads, directional keys, and the like. System 400 is also well suited to having a cursor directed or user input received by other means such as, for example, voice commands received via microphone 160. System 400 also includes an input/output (I/O) device 420 for coupling system 400 with external entities. For example, in one embodiment, I/O device 420 is a modem for enabling wired communications or modem and radio for enabling wireless communications between system 400 and an external device and/or external network such as, but not limited to, the Internet. I/O device 120 may include a short-range wireless radio such as a Bluetooth® radio, Wi-Fi radio (e.g., a radio compliant with Institute of Electrical and Electronics Engineers' (IEEE) 802.11 standards), or the like.

Referring still to FIG. 4, various other components are depicted for system 400. Specifically, when present, an operating system 422, applications 424, modules 426, and/or data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, ROM 410, computer-readable storage media within data storage unit 412, peripheral computer-readable storage media 402, and/or other tangible computer readable storage media.

Figure 5:
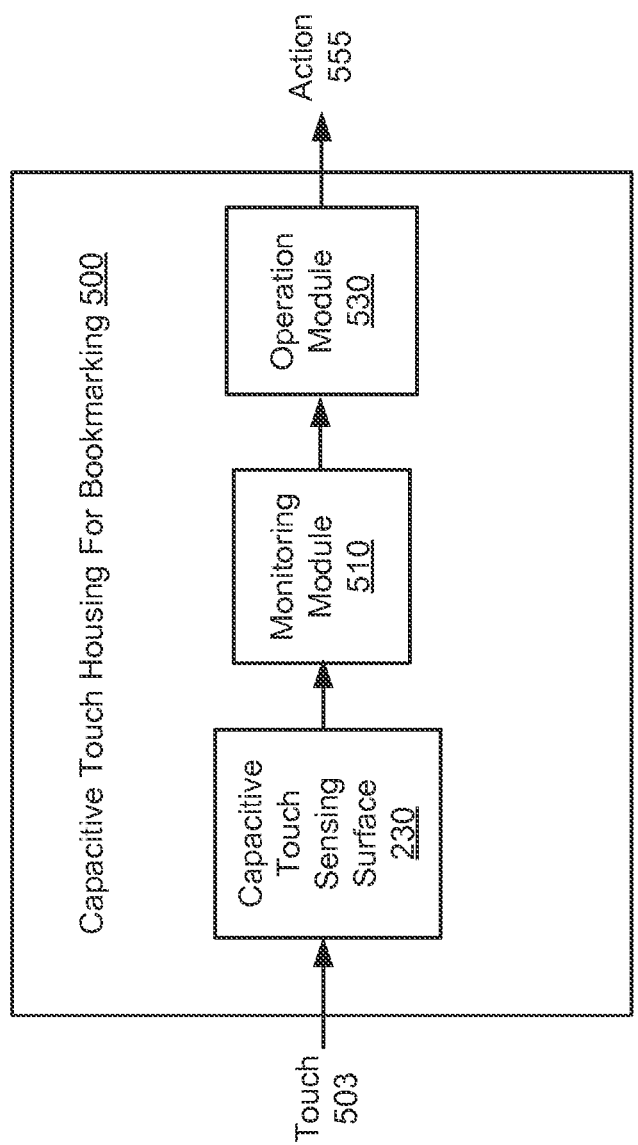
FIG. 5 shows a block diagram of a capacitive touch surface bookmarking system for an electronic personal display, in accordance with an embodiment.

With reference now to FIG. 5, a block diagram of a capacitive touch housing bookmarker 500 for an electronic personal display is shown in accordance with an embodiment. One example of an electronic personal display is an electronic reader (eReader).

In one embodiment, capacitive touch housing bookmarker 500 includes a capacitive touch sensing surface 230 on at least two non-planar portions of housing 110 of the electronic personal display, a monitoring module 510 and an operation module 530 that provides an action 555. Although the components are shown as distinct objects in the present discussion, it is appreciated that the operations of one or more of the components may be combined into a single module. Moreover, it is also appreciated that the actions performed by a single module described herein could also be broken up into actions performed by a number of different modules or performed by a different module altogether. The present breakdown of assigned actions and distinct modules are merely provided herein for purposes of clarity.

In one embodiment, capacitive touch sensing surface 230 is located on an at least one edge of housing 110. In another embodiment, capacitive touch sensing surface 230 is located on at least a rear surface 115 of housing 110. In yet another embodiment, capacitive touch sensing surface 230 covers the entire housing 110. In general, the capabilities and characteristics of capacitive touch sensing surface 230 on at least two non-planar portions of a housing 110 of the electronic personal display are described in detail herein in the discussion of FIGS. 1-3. As such, for purposes of clarity, instead of repeating the discussion provided in respect to FIGS. 1-3, the discussion of FIGS. 1-3 is incorporated by reference in its entirety herein.

In one embodiment, monitoring module 510 monitors output from capacitive touch sensing surface 230. For example, when a touch 503, such as by finger 201-1, occurs a signal is output from the capacitive touch sensing surface 230 in the area that was touched. Monitoring module 520 monitor the capacitive touch sensing surface 230 on at least two non-planar portions of a housing 110 and correlates the gesture with a bookmarking action to be performed by the electronic personal display. In general, the gesture-action correlation may be factory set, user adjustable, user selectable, or the like. Once a gesture-action correlation is determined, monitoring module 510 provides an input to operation module 530 to initiate the requested action. Operation module 530 then initiates the action 555.

In one embodiment, the pinch and slide type contact may be a factory defined gesture or a user definable metric. In general, the pinch type contact is noted by correlating contact from at least two non-planar points. For example, the contact may be a perpendicular contact or a contact between to generally opposite sides. In one embodiment, a pinch type contact is similar to that shown in FIGS. 2A and 2B. The slide 261 is shown in FIG. 2B by 201-2 and 201-2 of hand 251-1 being drawn along the two generally opposite points. In one embodiment, slide 261 may be along the entire length of the surfaces. In another embodiment, slide 261 may be performed along a substantial length of the surfaces. In another embodiment, slide 261 may be any distance that is less than a certain length. For example, slide 261 may be any distance less than 25% of the length of the side. In yet another embodiment, the length of slide 261 and/or the location of the initial pinch location may be user adjustable.

For example, assume the "add a bookmark" gesture is defined as: overlapping contact that includes a touch on the top right front surface 111 and the top right rear surface 115 (e.g., with reference to FIG. 1B, the portion of rear surface 115 which is directly behind the pinched portion of front surface 111) and then slide 261 along at least a portion of the top right front surface 11 and the top right rear surface 115. When monitoring module 510 receives the signals from capacitive touch sensing surface 230, monitoring module 510 will determine that a pinch contact that includes a touch on the top right front surface 111 and the top right rear surface 115 along with a maintained pinch that is "slid" along at least a portion of the surfaces 111 and 115 has occurred. Monitoring module 510 will correlate the gesture with the action "add a bookmark" and signal operation module 530 to perform the action "add a bookmark".

In another example, the "add a bookmark" gesture is defined as: overlapping perpendicular contact that includes a touch on the top of right front surface 111 and the top of right side surface 113 and then slide 261 occurs along at least a portion of right front surface 111 and right side surface 113. When monitoring module 510 receives the signals from capacitive touch sensing surface 230, monitoring module 510 will determine that a pinch contact that includes a touch on the top right front surface 111 and the top right surface 113 along with a slide 261 along at least a portion of the surfaces 111 and 113 has occurred. Monitoring module 510 will correlate the gesture with the action "add a bookmark" and signal operation module 530 to perform the action "add a bookmark".

In another embodiment, if monitoring module 510 receives signals from capacitive touch sensing surface 230 that indicate non-overlapping contact including a touch on the top right front surface 111 and the top right rear surface 115 has occurred. Monitoring module 510 will determine that the non-overlapping gesture is associated with no bookmarking action. As such, monitoring module 510 will not signal operation module 530 and no action will be performed.

Figure 6:
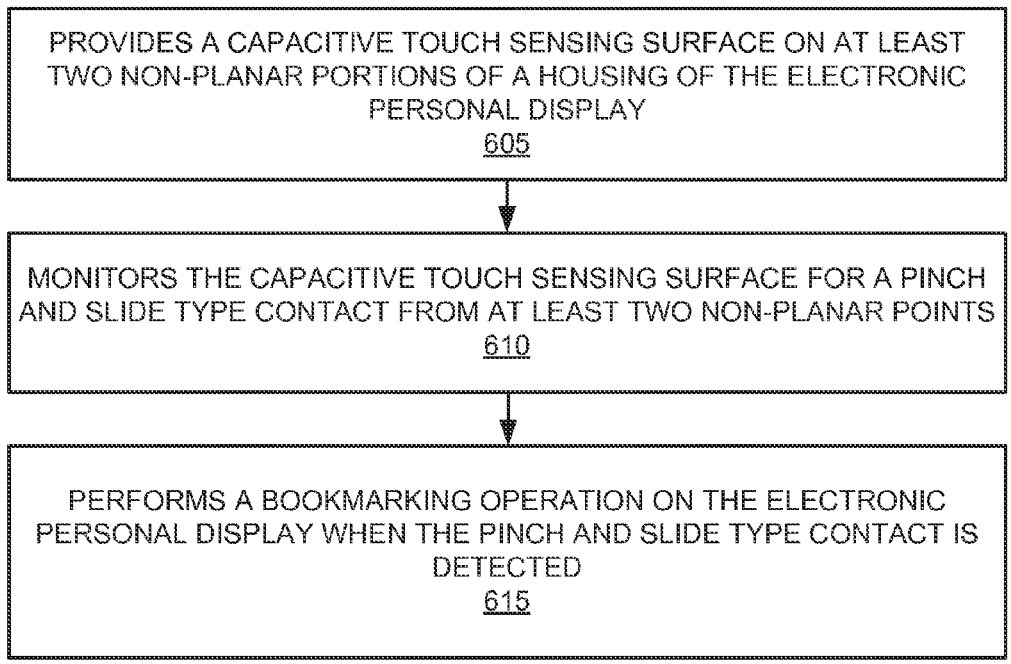
FIG. 6 illustrates a flow diagram of a method for utilizing a non-screen capacitive touch surface for bookmarking an electronic personal display, according to various embodiments.

Example Method of Utilizing a Non-Screen Capacitive Touch Surface for Bookmarking an Electronic Personal Display FIG. 6 illustrates a flow diagram 600 of a method of utilizing a non-screen capacitive touch surface for bookmarking an electronic personal display according to various embodiments. In one embodiment, the electronic personal display is an electronic reader (eReader). Elements of flow diagram 600 are described below, with reference to elements of one or more of FIGS. 1-5.

With reference now to 605 of FIG. 6 and to FIGS. 2A-B and 5, one embodiment provides a capacitive touch sensing surface on at least two non-planar portions of a housing 110 of the electronic personal display. In general, the capacitive touch surface may be, but is not limited to, a grid of conductive lines, a coat of metal, a flexible printed circuit grid and the like. In addition, the capacitive touch sensing surface may utilize directional sensitivity to provide touch-based gesture capabilities.

In one embodiment, the capacitive touch sensing surface may be on only portions of the housing 110, sides of housing 110, edges of housing 110, corners of housing 110, rear surface 115 of housing 110, on the entire housing 110, or a combination thereof. For example, capacitive touch sensing surface may be on one or more of the front surface 111, bottom surface 112, right side surface 113, left side surface 114, and rear surface 115 of housing 110 of eReader 100.

In one embodiment, since housing 110 of the electronic personal display includes one or more capacitive touch sensing surface(s), screen 120 may not necessarily be a capacitive touch sensing surface. Instead, each touch or gesture that would normally be performed on the screen would instead be performed on the housing. In so doing, screen manufacturing costs may be reduced. Additionally, by moving the capacitive touch sensing surface away from the screen, the screen would not be subject to as much touching, swiping, tapping and the like and would provide a cleaner reading surface. However, in another embodiment, the screen of the electronic personal display may have a capacitive touch sensing surface.

Referring now to 610 of FIG. 6 and to FIGS. 2A-B and 5, one embodiment monitors the capacitive touch sensing surface for a pinch and slide type contact from at least two non-planar points. For example, the non-planar points may be generally orthogonal points such as front surface 111 and side surface 113/114 or side surface 113/114 and rear surface 115, or generally opposite points such as, front surface 111 and rear surface 115 or left surface 114 and right surface 113.

In one embodiment, no hard buttons are required for the electronic personal display. That is, there is no need for a hard button on eReader 100 since the capacitive touch sensing surface of the housing 110 is monitored for pinch and slide type gestures. In so doing, a greater robustness with regard to dust, fluid contaminants, sand and the like can be achieved. In other words, by removing the hard buttons there is there are fewer openings through which sand, debris or water can enter the device. Moreover, robustness of the electronic personal display is enhanced since there is no hard button to get gummed up, stuck, spilled on, broken, dropped, dirty, dusty and the like. In an embodiment where no power-up hard button is included, on off switch 130 of FIGS. 1A, 1B, and 3 is replaced by a smooth surface of housing 110 and a touch sensing surface is used to perform the functions of on/off switch 130.

With reference now to 615 of FIG. 6 and to FIGS. 2A-B and 5, one embodiment performs an operation on the electronic personal display when the pinch and slide type contact is detected. Moreover, the location of the pinch and slide type contact may also be utilized to determine the type of bookmarking operation to be performed. For example, the location of the pinch and slide type contact may be, but is not limited to, a top corner, a top edge, a side, a bottom corner, a bottom edge or the like. Similarly, the bookmarking operation may be, but is not limited to, adding a bookmark, removing a bookmark and invocation of a bookmark.

In one embodiment, the pinch and slide location and associated bookmarking action may be factory defined or user adjustable. In other words, the user may correlate a defined contact type with a defined operation to be performed by the electronic personal display.

For example, assume a user is reading on eReader 100. Additionally, the add bookmark command has been defined as overlapping contact occurring on at least two generally oppositely areas. In this instance, the overlapping contact includes a touch on the top right front surface 111 and the top right rear surface 115 (with reference to FIG. 1A). In one embodiment, the pinch and slide is similar to the dog-earing that is sometimes performed to mark a page in a printed book.

In addition, the return to last bookmarked location command has been defined as overlapping contact including a touch on the top left front surface 111 and the top left rear surface 115. When the top right front and rear surfaces of housing 110 are pinched and the pinch is "slid" along at least a portion of the surfaces of housing 110, the gesture is reviewed by monitoring module 510 and the add bookmark command is recognized. The add bookmark command is then passed from monitoring module 510 to operation module 530 which performs the add bookmark action 555.

Similarly, if a pinch and slide type contact occurs on the top left front surface 111 and the top left rear surface 115 (with reference to FIG. 1A), the gesture is reviewed by the gesture definer 520 and the return to last bookmarked page command is recognized. The last bookmark command is then passed from gesture definer 520 to operation module 530 which performs the return to last bookmarked page action 555. In so doing, the user can bookmark pages and navigate through previously bookmarked pages without having to utilize a hard or soft button.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for utilizing a non-screen capacitive touch surface for bookmarking an electronic personal display, said method comprising:
   providing a capacitive touch sensing surface on at least two non-planar portions of a housing of the electronic personal display;
   monitoring the capacitive touch sensing surface for a pinch and slide type contact from at least two non-planar points; and
   performing a bookmarking operation on the electronic personal display when the pinch and slide type contact is detected.

2. The method of claim 1 wherein the electronic personal display is an electronic reader (eReader).

3. The method of claim 1 further comprising:
   receiving the pinch and slide type contact from at least two generally opposite points.

4. The method of claim 1 further comprising:
   detecting the pinch and slide type contact from at least two generally perpendicular points.

5. The method of claim 1 further comprising:
   providing the capacitive touch sensing surface on at least one edge of the electronic personal display.

6. The method of claim 1 further comprising:
   providing the capacitive touch sensing surface on an entirety of the housing of the electronic personal display.

7. The method of claim 1 further comprising:
   correlating a location of the pinch and slide type contact with the bookmarking operation to be performed by the electronic personal display.

8. The method of claim 7 wherein the location of the pinch and slide type contact is selected from the group consisting of: a top corner, a top edge, a side, a bottom corner and a bottom edge.

9. The method of claim 7 wherein the bookmarking operation is selected from the group consisting of: adding a bookmark, removing a bookmark and invocation of a bookmark.

10. An electronic personal display with capacitive touch housing for bookmarking comprising:
    a capacitive touch sensing surface on at least two non-planar portions of a housing of the electronic personal display;

a monitoring module to monitor the capacitive touch sensing surface and provide an output when a pinch and slide type contact from at least two generally opposite points is detected by the capacitive touch sensing surface; and an operation module to receive the output from the monitoring module and perform a bookmarking action related to the output.

11. The electronic personal display of claim 10 wherein the electronic personal display has no hard buttons thereon.

12. The electronic personal display of claim 10 wherein the capacitive touch sensing surface is located on at least one edge of the housing.

13. The electronic personal display of claim 10 wherein the capacitive touch sensing surface covers on an entirety of the housing.

14. The electronic personal display of claim 10 wherein a location of the pinch and slide type contact is correlated with the bookmarking action to be performed by the electronic personal display; and the location of the pinch and slide type contact is selected from the group consisting of: a top corner, a top edge, a side, a bottom corner and a bottom edge.

15. The electronic personal display of claim 14 wherein the bookmarking action to be performed is selected from the group consisting of: adding a bookmark, removing a bookmark and invoke a bookmark.

16. A method for utilizing a non-screen capacitive touch surface for bookmarking an electronic reader (eReader), said method comprising:

providing a capacitive touch sensing surface on at least two non-planar portions of a housing of the eReader;

monitoring the capacitive touch sensing surface for a pinch and slide type contact from at least two generally opposite points;

correlating a location of the pinch and slide type contact with a bookmarking operation to be performed by the eReader; and performing the bookmarking operation on the eReader.

17. The method of claim 16 further comprising:
providing no hard buttons on the eReader.

18. The method of claim 16 further comprising:
providing the capacitive touch sensing surface on at least one edge of the housing of the eReader.

19. The method of claim 16 further comprising:
providing the capacitive touch sensing surface on an entirety of the housing of the eReader.

20. The method of claim 16 wherein the location of pinch and slide type of contact is selected from the group consisting of: a top corner, a top edge, a side, a bottom corner and a bottom edge.

21. The method of claim 16 wherein the bookmarking operation is selected from the group consisting of: adding a bookmark, removing a bookmark and invoke a bookmark.

* * * * *